United States Patent [19]

Khlafallah et al.

[11] Patent Number: 4,620,688
[45] Date of Patent: Nov. 4, 1986

[54] ENERGY ABSORBING APPARATUS FOR PIPING SYSTEM AND THE LIKE

[75] Inventors: Mohamed Z. Khlafallah, Concord; Hong M. Lee, Richmond, both of Calif.

[73] Assignee: Bechtel International Corporation, San Francisco, Calif.

[21] Appl. No.: 568,861

[22] Filed: Jan. 6, 1984

[51] Int. Cl.$^4$ .............................................. F16L 3/20
[52] U.S. Cl. .................................. 248/542; 248/550; 248/638; 248/629; 248/DIG. 1; 248/62
[58] Field of Search .............. 248/542, 636, 622, 618, 248/638, 60, 62, DIG. 1, 592, 571, 629, 58, 550

[56] References Cited

U.S. PATENT DOCUMENTS

| | | | |
|---|---|---|---|
| 2,828,801 | 4/1958 | Papst | 248/629 |
| 3,637,173 | 1/1972 | Suozzo | 248/542 |
| 4,050,660 | 9/1977 | Eggmann | 248/DIG. 1 |
| 4,142,702 | 3/1979 | Lamboo | 248/DIG. 1 |
| 4,190,227 | 2/1980 | Belfold | 248/618 |
| 4,206,898 | 6/1980 | Salter | 248/571 |
| 4,328,944 | 5/1982 | Popper | 248/571 |

FOREIGN PATENT DOCUMENTS 1342661 1/1974 United Kingdom .

OTHER PUBLICATIONS

Stiemer et al, Shaking Table Tests of Piping Systems with Energy-Absorbing Restrainers, 9-1980, vol. 4, pp. 25, Fig. 2.13.

Schneider et al; Behavior of a Piping System Under Seismic Excitation, 5-1982, pp. 34, Fig. 5.

Primary Examiner—Reinaldo P. Machado
Assistant Examiner—Alvin Chin-Shue
Attorney, Agent, or Firm—Townsend and Townsend

[57] ABSTRACT

Apparatus for absorbing the energy associated with the displacements of pipes and other structural elements due to seismic and other dynamic forces. The apparatus includes a base on which a number of energy absorbing, plate-like members are mounted in cantilever fashion. The outer, free ends of the members are coupled to an arm which extends outwardly from the members and has an outer end connected to a pipe or other structural element whose displacement is to be controlled. Each member has convergent side edges on each side, respectively, of a narrowed central part, and the central parts of the adjacent members are substantially aligned with each other and with the outer end of the arm. Thus, when the pipe or structural element to which the arm is connected is displaced, the energy absorbing members bend, and uniformly yield, as the outer free end of the members remain in a plane substantially parallel to the plane of the fixed ends of the members. The members are thereby kept out of compression or tension which could otherwise cause buckling of the members. The rod extends through curved slots in a pair of parallel walls secured to the base, the ends of the slots defining stops to limit the travel of the rod and thereby the bending of the members under the influence of extreme displacement of the pipe or structural element.

14 Claims, 8 Drawing Figures

FIG. 1
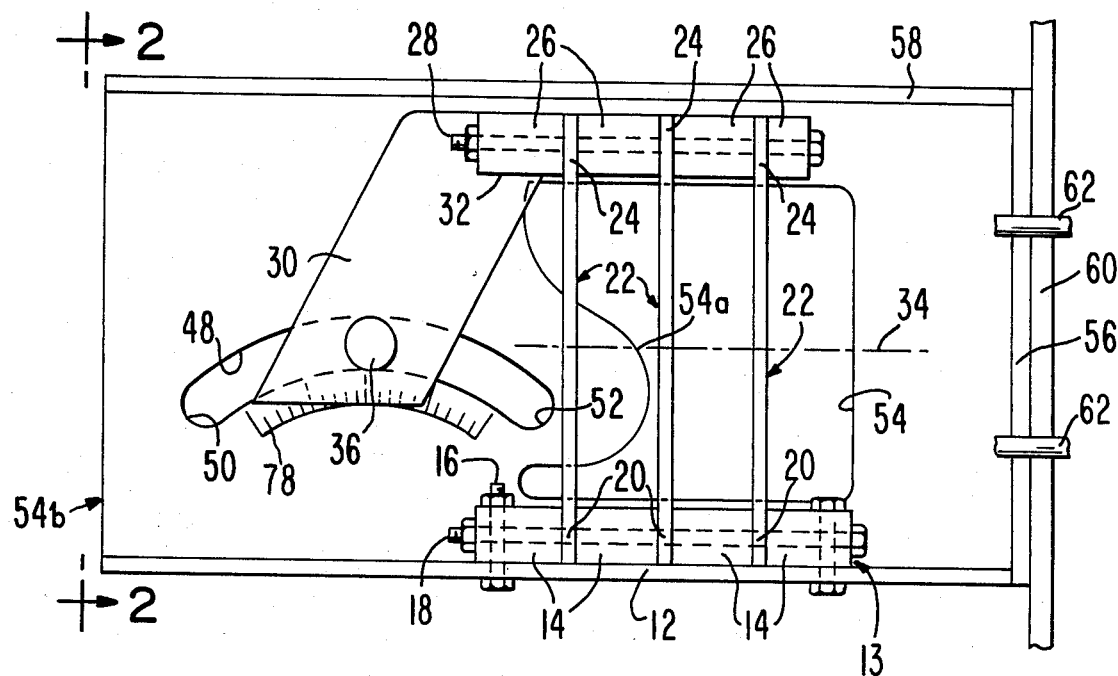
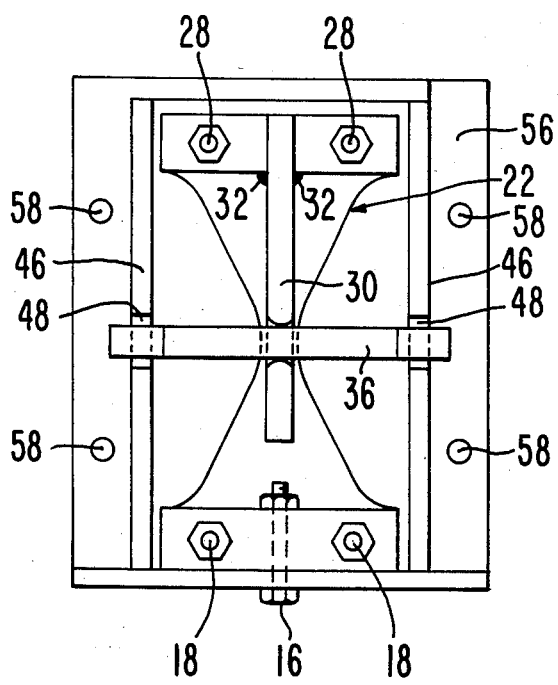
FIG. 2
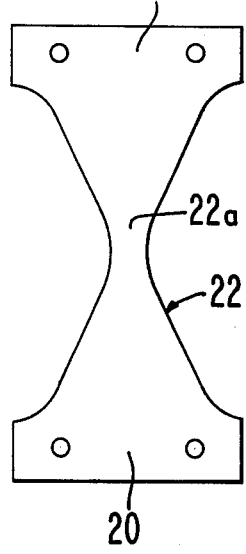
FIG. 3

ENERGY ABSORBING APPARATUS FOR PIPING SYSTEM AND THE LIKE

BACKGROUND OF THE INVENTION

1. Field of the Invention

This invention relates to improvements in the dissipation of energy due to seismic and other forces and, more particularly, to an improved energy absorbing apparatus which can be coupled to piping system and other structural elements where displacements due to such forces are to be controlled.

2. Description of the Prior Art

In nuclear and other types of power plants, piping systems are required to carry fluids of different types, such as high pressure steam, waste liquids and the like. It is extremely important that such piping systems remain intact and not be damaged in any way during the time when external forces are exerted thereon. Thus, the need to support the piping in such a way to provide direct support and energy absorption due to displacements of such a piping system is clearly obvious, and many attempts have been made in the past to provide support or energy dissipation devices for use in overcoming the problems which could arise if such piping systems were to be displaced beyond an acceptable limit.

Typically, there are two categories of loading of piping systems of the type described. The first of these categories is associated with static loading, such as those forces applied to a piping system due to thermal expansion. In such a case, supports must be designed to be sufficiently flexible so that pipe expansion will not be restricted so as to cause harmful pipe stresses. The second category is dynamic loading, such as applied forces due to seismic events. In this case, supports must be rigid enough to reduce displacements, accelerations and other piping dynamic responses. To satisfy both of the foregoing problems, it is necessary to provide support or energy absorbing means which is dependent upon the system frequency.

In conventional plant designs, the most frequently used device is a shock arrestor or snubber. Such a device introduces very low resistance at low velocity or acceleration but locks effectively whenever the piping system is vibrating at a higher frequency.

Conventional snubbers, however, do have some severe drawbacks. First of all, they are expensive, require maintenance, and are difficult to install or maintain in a complex piping system. Worst of all, at times snubbers lock instantaneously when the need arises and occasionally they may malfunction and inadvertently lock up when no such need exists. These drawbacks reduce the overall reliability of the installations on which snubbers are used. Even if these drawbacks are overcome, conventional snubbers still present problems in design and operating procedures. Since an elastically analyzed piping system where snubbers are used does not effectively dissipate energy, interaction between the piping system and the supporting structure using conventional snubbers can be so significant that both the piping system and the supporting structure cannot be designed independently of each other.

Other attempts have been made to provide improved energy absorbing devices which are adapted to be coupled to piping systems or the like. Certain of these devices have been disclosed in the following reports published by the College of Engineering University of California, Berkeley, Calif.:

1. Report No. UCB/EERC-80/33, September, 1980, entitled "Shaking Table Tests of Piping Systems with Energy Absorbing Restrainers" by S. F. Steimer and W. G. Godden.
2. Report No. UCB/EERC-81/09, July, 1981, entitled "Experimental Behavior of a Spatial Piping System with Steel Energy Absorbers Subjected to a Simulated Differential Seismic Input", by S. F. Steimer, W. G. Godden and J. M. Kelly.
3. Report No. UCB/EERC-82/03, May 1982, entitled "Behavior of a Piping System Under Seismic Excitation", by S. Schneider, H. M. Lee and W. G. Godden.

In the first of these reports, a single energy absorbing device is disclosed for use as the sole energy absorbing means at a particular location along the length of a pipeline. The device has a pair of opposed ends and a pair of side edges extending from one end and converging to the other end, whereby the other end has a narrowed configuration with respect to the one end. In the other two reports, a single energy absorbing device of a bow tie or X-shaped configuration is provided for a particular pipeline location for controlling the displacement of a piping system and thereby absorb the energy due to the moving pipeline. The device has a central narrow part and relatively wide outer end.

Generally, there are a number of problems associated with the use of devices of the type disclosed in the above reports. For instance, to keep the ends always parallel to each other, the way in which such a device is coupled to a piping system disallows the pipe to displace in a transverse direction or to rotate in any direction where such movements are desired.

Because of the foregoing drawbacks, a need has arisen for an improved apparatus for absorbing energy at each of a plurality of locations along a moveable piping system or other structural elements whose displacement is to be controlled to prevent structural damage thereto. The present invention satisfies the aforesaid need as hereinafter described.

SUMMARY OF THE PRESENT INVENTION

The present invention is comprised of a number of plate-like energy absorbing member of a bow tie or X-shaped configuration, each member being preferably formed from a mild steel material, such as low carbon steel of high ductility. Each of the members has relatively wide end parts and a relatively narrow central part with the side edges of each of the members converging to the central part from the outer, relatively wide end parts thereof.

First ends of the members are mounted on a support base or plate in a manner such that the members extend outwardly from the base and are parallel with each other so that the members are effectively cantilevered on the base. Spacer means at the outer free ends of the members hold the members generally parallel with each other, and an arm extends outward from one end of the spacer means and has an outer end secured to one end of an elongated connector. The opposite end of the connector is coupled to a piping system or other structural element whose displacement is to be controlled. The attachment point between the outer end of the arm and the connector lies substantially in a plane passing through the central parts of the members to minimize tension and compression in the members during displacement of the arm and thereby the outer end of the members themselves. Thus, the members will at all times be substantially free of structural damage due to buckling, whereby the apparatus of the present invention will have a long, useful operating life and will not require maintenance or replacement due to structural damage thereto.

The outer end of the arm coupled to the spacer means at the outer free ends of the members has a rod to which the one end of the connector is coupled, such as by clevis, thus facilitating free pipe rotations in the directions where rotations are desired. The rod also extends through curved slots in a pair of parallel walls secured to the base on which the members are mounted. The ends of the slots serve as stops to limit the travel of the rod and thereby the connector coupled to the piping system or structural element whose displacement is to be controlled.

The apparatus can be mounted on a structural wall or floor adjacent to the piping system or structural element.

The primary object of the present invention is to provide an improved apparatus for absorbing energy embodied in a normally flexed pipeline or structural element, which is moveable under expansion and seismic forces, wherein the apparatus include a number of spaced, cantilevered energy absorbing members which have a specific shape and are coupled to the pipeline or structural element in a manner such that movement of the members will absorb the energy associated with the moving pipeline or structural element providing free pipe rotations in desired directions while avoiding any tendency to buckle or to be otherwise structurally damaged.

Another object of the present invention is to provide an apparatus of the type described wherein each member has an X-shaped configuration to present a narrowed central part and relatively wide end parts wherein the central parts of the members mounted in place are substantially aligned with each other and aligned with the point at which the pipeline or structural element is connected to the apparatus and thereby prevent the members from being subjected to compression as they are deflected due to displacement of the pipeline or structural element with respect to the apparatus itself.

Other objects of this invention will become apparent as the following specification progresses, reference being had to the accompanying drawings for an illustration of the invention.

IN THE DRAWINGS

FIG. 1 is a side elevational view of the energy absorbing apparatus of the present invention showing a number of energy absorbing members arranged in a group and coupled to an arm to which is secured a pipe or other structural element whose displacement is to be controlled;

FIG. 2 is an end elevational view of the apparatus of FIG. 1, looking in the direction of line 2—2 of FIG. 1;

FIG. 3 is an elevational view of one of the energy absorbing members of the apparatus of FIG. 1;

DETAILED DESCRIPTION OF THE PREFERRED EMBODIMENT

Figure 4:
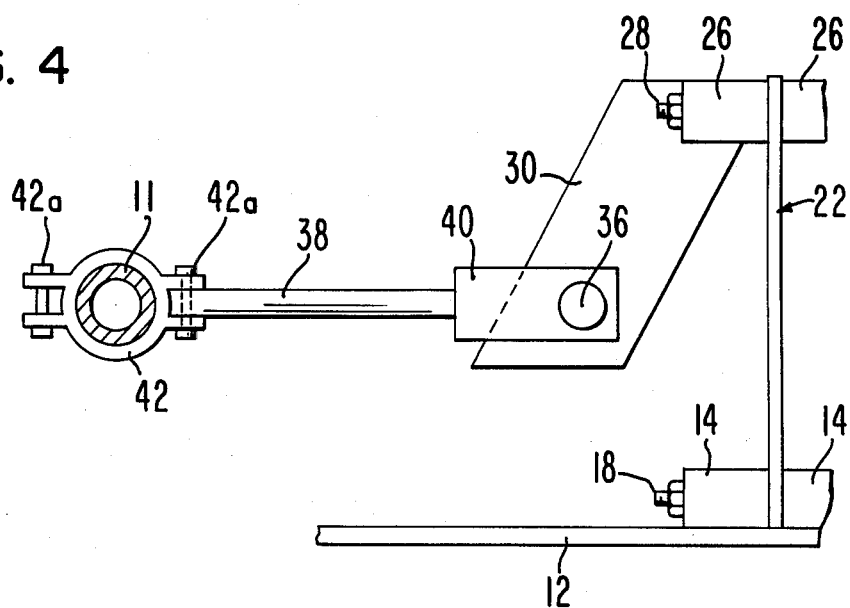
FIG. 4 is a fragmentary side elevational view of a connector for coupling the energy absorbing members to a pipeline.

The energy absorbing apparatus of the present invention is broadly denoted by the numeral 10 and is adapted to absorb the energy associated with displacements of for example a pipeline 11 (FIGS. 4 and 5) due to vibration and other forces exerted on the pipeline. Such forces include thermal expansion of the pipeline as well as high frequency loading, such as loading due to seismic response. Apparatus 10 is adapted to be rigidly secured to a suitable support, such as the wall or floor of a building adjacent to the pipeline so that apparatus 10 is substantially in a fixed position with respect to the support.

Apparatus 10 includes a base plate 12 having a mount 13 thereon comprised of a number of spacers 14 secured to the base plate by bolts 16 and 18 or by way of welding and bolts 18. Spacers 14 are positioned to clamp first ends 20 of a plurality of plate-like energy absorbing members 22 (FIG. 3) so that the members are spaced apart, are generally parallel with each other as shown in FIG. 1, and are cantilevered on and generally perpendicular to base plate 12. The second ends 24 of members 22 are held spaced apart and generally parallel with each other by coupling means including a number of spacers 26 which are clamped together and against adjacent ends 24 by bolts 28 to second ends 24. The ends of members 22 have holes (FIG. 3) for receiving bolts 18 and 28.

Figures 6, 7:
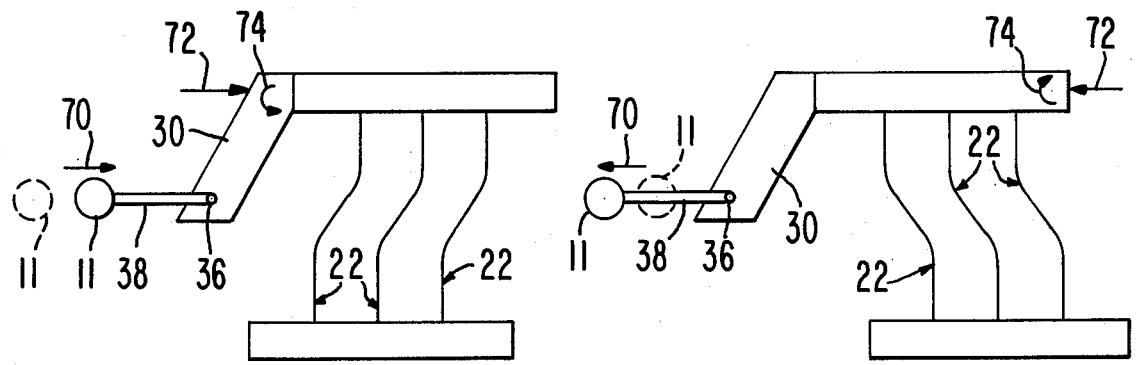
FIGS. 6 and 7 are schematic views of apparatus showing the way in which the energy absorbing members are deflected as they absorb the energy due to displacement of a pipeline to which the members are connected.

Members 22 are substantially identical, and each member 22 has a shape as shown in FIG. 3. To this end, each member 22 has a pair of convergent, side marginal edges on each side of a relatively narrow central part 22. Thus, each member has a substantially X-shape. Moreover, the narrowed central part of each member allow the member to bend in the manner as shown in FIGS. 6 and 7 as hereinafter described.

Each member 22 is formed from a suitable material, such as a low carbon steel having a high ductility. The member is of cut or otherwise formed from a steel plate, typically of standard thicknesses, such as thicknesses of 0.125 inch, 0.25 inch, 0.5 inch, 0.75 inch and the like. The thickness and the length of the member 22 are selected on the basis of the size of the pipeline 11 or other structural element to which apparatus 10 is to be coupled. A mathematical calculation technique is used to determine the optimum selection of members 22. A typical length of member 22 is 4 inches and a typical thickness is 0.25 inch. Member 22 can also be cut or shaped of custom length and thickness as may be suitable for certain custom applications.

When members 22 are mounted on the base plate 12 by spacers 14, the central parts 22a of members 22 are all substantially aligned with each other. FIG. 2 serves to illustrate this alignment.

One of the end spacers 26 has an arm 30 secured thereto and projecting outwardly at an angle therefrom in the manner shown in FIG. 1. Arm 30 can be secured in any suitable manner to the end spacer 26. A typical connection is by way of a weld 32 at the faces of spacer 26 abutting the adjacent end marginal edges of the arm 30. The length of arm 30 is such that it extends beyond the imaginary center line 34 (FIG. 1) which passes through the central parts 22a of members 22.

Arm 30 carries a rod 36 as shown in FIGS. 1 and 2, the rod projecting outwardly from opposed sides of the arm as shown in FIG. 2. This rod has a central axis which lies on the imaginary centerline 34 and is in the plane of such centerline. The rod provides a means of attaching one end of a rigid connector 38 which can be a strap, a rod or other structural element.

Figure 5:
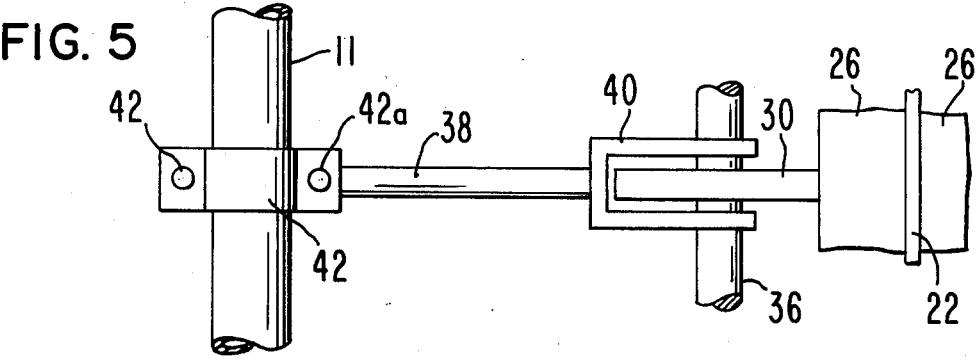
FIG. 5 is a top plan view of the connector of FIG. 4.

Connector 38 is secured in any suitable manner to rod 36, such as by a clevis 40 (FIG. 5). The connector, for purposes of illustration, is shown as being a rod having one end threaded into clevis 40 for causing a rigid connection therewith. The opposite end of the connector is provided with a clamp or band 42 coupled by bolts 42a for securing the same to pipeline 11, whereby the pipeline and the rod 36 are rigidly interconnected. The length of connector 38 is selected to position apparatus 10 reasonably close to pipeline 11 yet allow the pipeline to be displaced due to expansion and external forces exerted thereon.

Apparatus 10 further includes a pair of parallel walls 46 secured to base plate 12 and extending outwardly therefrom as shown in FIG. 2. Each wall 46 has a curved slot 48 through which the adjacent end of rod 36 extends. The purpose for this slot is to provide end surfaces 50 and 52 which serve as stops which limit the travel of rod 36 and thereby arm 30 in either direction due to displacement of pipeline 11. The slots are curved because rod 36 traverses a curved path due to the bending of members 22 in a manner shown in FIGS. 6 and 7 as hereinafter described. Immediately underneath the slots, a color-coded displacement scale 78 is affixed to or painted on side walls 46. The purpose of the color-coded chart is to provide for an easy means of inspecting and recording pipeline 11 displacement by observing the locations and movements of rod 36 in slots 48. Either or both these sidewalls 46 can be provided with an opening 54 there to allow for inspection of the structural condition of members 22. Opening 54 is generally rectangular throughout its extent except for one curved or convex side edge 54a as shown in FIG. 1.

Sidewalls 46 can be combined with an end wall 56 and a wall 58 opposite to base plate 12, whereby apparatus 10 is essentially housed in a protective box having an open end adjacent to end margins 54b of walls 46 (FIG. 1). This open end is to allow connector 38 (FIGS. 4 and 5) to extend into the box.

As shown in FIG. 2, end plate 56 is greater in width than the spacing between walls 46 so as to present side extensions for holes 58 so that the system can be mounted on an adjacent structural wall or floor.

In operation, apparatus 10 is secured in any suitable manner, such as to a structural wall 60 (FIG. 5). This is effected by securing end wall 56 to wall 60 by bolts 62 or by welding. The wall is spaced from pipeline 11 and, when apparatus 10 is mounted on wall 60, rod 36 is in the plane perpendicular to the direction of movement of pipeline 11. The pipeline can be horizontal, vertical or inclined.

With connector 38 secured to the pipeline and to rod 36, the system is in condition to absorb the energy due to displacement of pipeline 11 under forces such as seismic forces which impart vibration and shock to the pipeline.

For a first lateral force exerted on the pipeline in a direction toward apparatus 10 (FIG. 6), the pipeline is displaced laterally from the dashed line position of FIG. 6 to the full line position thereof. When this occurs, the bank of spacers 26 moves the second ends 24 of members 22 laterally from the equilibrium planes (FIG. 1) of members 22. Each member 22 bends at a pair of locations immediately on opposite sides of its central part 22a and, because of the plurality of members 22 in apparatus 10, the bank of spacer 26 remains substantially parallel with the bank of spacers 14 affixed to base plate 12.

FIG. 7 illustrates the opposite case where the pipeline is displaced in the opposite direction from a dashed line position to a full line position. In such a case, members 22 assume the shapes thereof shown in FIG. 7 with the bank of spacers 26 having moved in the opposite direction but always remaining parallel with the bank of spacers 14 affixed to base plate 12.

Apparatus 10 effectively operates with a plurality of members 22, to cause spacers 26 to remain parallel with spacers 14 during any displacement of the pipeline. The minimum number of members 22 in apparatus 10 is two and typically, there are three or more such members.

Arm 30 is an integral part of system 10 because it creates a moment in addition to creating a force exerted on ends 24 of members 22. This is illustrated in FIG. 6 wherein the application of a force denoted by arrow 70, to the pipeline 11 is equivalent to the application of a force 72 and a moment 74 on the end of the bank of spacers 26 as shown in FIG. 6. The force indicated by arrow 72 causes displacement of the ends 24 of members 22 as shown in FIG. 6 and the moment, indicated by an arrow 74, substantially prevents the members from being put into compression or tension. If any one of members 22 were under compression, it would be highly probably that the member would buckle and possible be structurally damaged so as to be no longer effective as an energy absorber.

Figure 8:
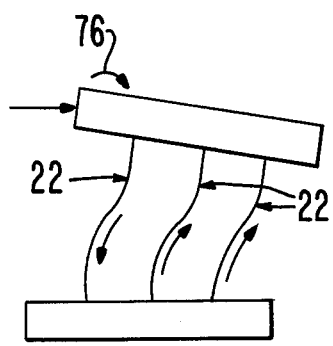
FIG. 8 is a view similar to FIGS. 6 and 7 but showing the adverse effects of applying a force to another part of the apparatus.

The effect of compression and tension on members 22 without the use of arm 30 as shown in FIG. 8 wherein it is assumed that pipeline 11 is coupled directly to the bank of spacers 26 coupled to ends 24 of members 22. If the force is applied at this location, there will be an internal moment indicated by arrow 76 which will tend to pivot the bank of spacers 26 in a clockwise direction when viewing FIG. 8. This will cause the right-hand members 22 to be under compression while the left-hand member 22 will be under tension. While it is possible that no structural damage will be caused to the left-hand member 22 under tension, it is highly probable that the right-hand member 22 will buckle and could undergo a permanent set which would prevent them from being used further as energy absorbers. Thus, the use of arm 30 and by placing rod 36 on the arm so that the rod is in alignment with the central parts of 22a of members 22, this structural problem is avoided.

The present invention provides an energy absorbing apparatus which is simple and rugged in construction, is quickly and easily mounted in place and coupled to a pipeline or other structural element whose displacement due to external forces is to be controlled. The apparatus has a long useful operating life and requires substantially no maintenance. Thus, the invention is suitable for a wide number of uses, including use as an energy absorber for pipelines in nuclear power plants and other such facilities where protection against damage due to volatile fluids and other dangerous constituents presents important design considerations which cannot be overlooked.

We claim:

1. Apparatus for absorbing the energy embodied in a moving structural element of a structural system comprising:
   a support;
   a number of spaced, plate-like energy absorbing members mounted at first ends thereof directly to the support and extending outwardly in cantilever fashion from the support in generally parallel planes with respect thereto, each member having a first part which is smaller in width than the outer end parts thereof, the first parts of the members being generally aligned with each other;
   means at the outer free ends of the members for coupling said outer free ends to each other, whereby the outer free ends can move together when a lateral force is exerted thereon;
   an arm secured to said coupling means and extending outwardly therefrom, the outer end of the arm being generally aligned with the first parts of the members; and
   means pivotally coupled with the outer end of the arm for connecting the arm to the structural element of said structural system to be controlled.

2. Apparatus as set forth in claim 1, wherein each member has a pair of opposed side marginal edges on each side, respectively, of the first part thereof, the side edges on a respective side of the first part being convergent toward the first part, the major portion of the space between each pair of adjacent member being free of structure.

3. Apparatus as set forth in claim 1, wherein is included spacer means coupled with said first ends of the members for securing the first ends to the support.

4. Apparatus as set forth in claim 1, wherein the arm extends outwardly from said coupling means at an angle with respect to the plane passing through the free ends of said members, and including means coupled with said support for housing the members, said coupling means and said arm.

5. Apparatus as set forth in claim 1, wherein each member is formed from low carbon steel of high ductility.

6. Apparatus as set forth in claim 1, wherein the outer end of the arm has a rod extending therethrough and projecting outwardly from the arm in opposed directions, said connector means being attached to the rod.

7. Apparatus as set forth in claim 6, wherein the structural element is elongated, said rod being coupled to the arm with the rod being generally parallel with the structural element.

8. Apparatus as set forth in claim 6, wherein said connector means includes a clevis secured to the rod and an elongated connector element coupled to the clevis, the outer end of the connector element having means thereon for securing the same to the structural element.

9. Apparatus as set forth in claim 6, wherein is included a wall secured to and extending outwardly from the support, said wall having a curved slot therein and a color-coded, graded displacement scale adjacent to the slot, the rod on the arm extending through the slot, the ends of the slot defining stops to limit the travel of the rod in the slot.

10. Apparatus for absorbing the energy embodied in a moving structural element of a structural system comprising:
    a support;
    a number of elongated plate-like energy absorbing members;
    first spacer means mounting first ends of the members directly to the support with the members extending outwardly in cantilever fashion from the support in generally parallel planes, each member having a central part which is smaller in width than the outer end parts thereof and a pair of opposed side marginal edges on each side, respectively, of the central part thereof, the side edges on a respective side of the central part being convergent toward the central part, the central parts of the members being generally aligned with each other, the major portion of the space between each pair of adjacent members being free of structure;
    second spacer means at the outer free ends of the members for coupling said outer free ends to each other, whereby the outer free ends can move together when a lateral force is exerted thereon;
    an arm secured to said second spacer means and extending outwardly therefrom at an angle with respect thereto, the outer end of the arm being generally aligned with the central parts of the members;
    a rod extending through the arm and projecting outwardly from the arm is opposed directions;
    means coupled with the rod for pivotally connecting the arm to the structural element of said structural system to be controlled; and
    a housing coupled with the support for containing said members, said first spacer means, said second spacer means and said arm.

11. Apparatus as set forth in claim 10, wherein said housing includes a pair of spaced walls secured to and extending outwardly from the support, each wall having a curved slot and a displacement scale adjacent to the slot, the rod on the arm extending through the slot, the ends of the slot defining stops to limit the travel of the rod in the slot.

12. Apparatus as set forth in claim 10, wherein each member is formed from low carbon steel of high ductility.

13. Apparatus as set forth in claim 10, wherein, if for custom designs or for applications where the apparatus is placed in a corrosive environment, the members are formed from stainless steel.

14. Apparatus for absorbing the energy embodied in a moving structural element of a structural system comprising: a support; an elongated energy absorbing structure mounted at a first end thereof directly to the support and extending outwardly therefrom, said structure having a plate-like body provided with an intermediate part which is smaller in width than the outer end parts thereof; an arm secured to a second end of said structure and extending outwardly therefrom at an angle with respect thereto, the outer end of the arm being spaced from and generally aligned with the intermediate part of the structure; and means pivotally coupled with the outer end of the arm for connecting the arm to the structural element of said structural system to be controlled.

* * * * *